Nov. 4, 1952          N. L. DICKINSON          2,616,912
METHOD OF SOLVENT RECOVERY
Filed July 8, 1948
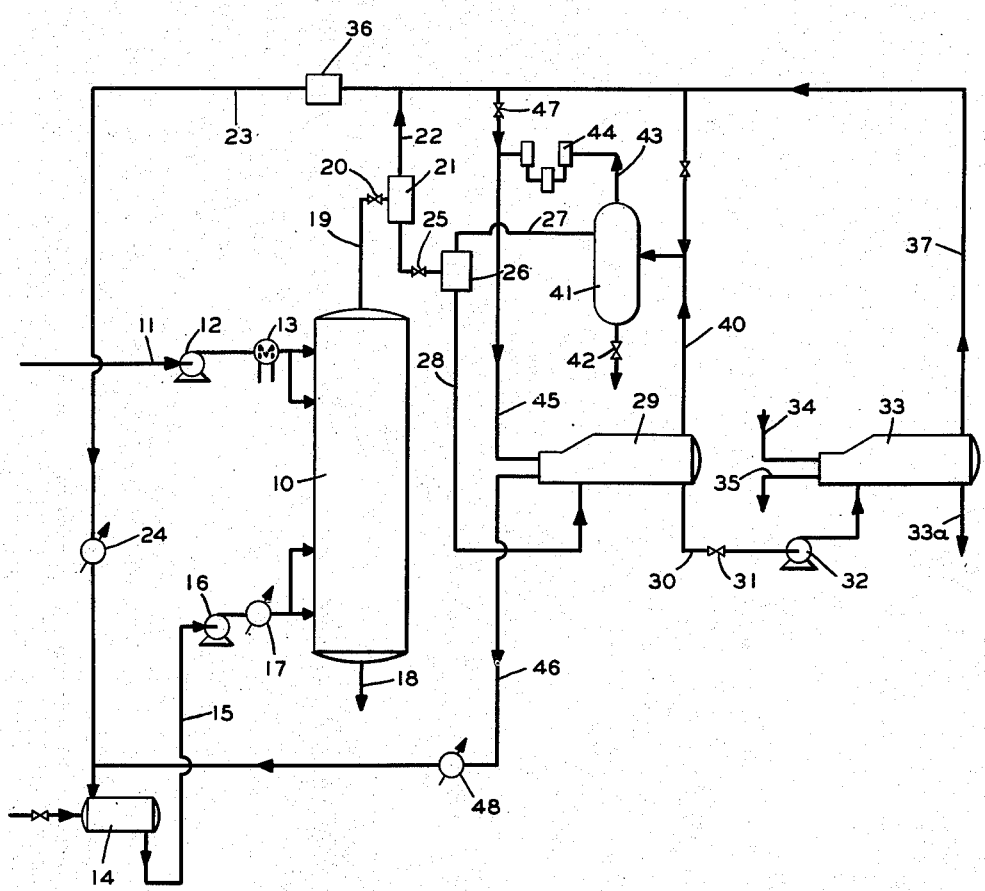
INVENTOR
NORMAN L. DICKINSON
BY E. F. Liebrecht
Edmond F. Shanahan
ATTORNEYS

Patented Nov. 4, 1952

2,616,912

UNITED STATES PATENT OFFICE 2,616,912

METHOD OF SOLVENT RECOVERY

Norman L. Dickinson, Basking Ridge, N. J., assignor to The M. W. Kellogg Co., Jersey City, N. J., a corporation of Delaware Application July 8, 1948, Serial No. 37,635

1 Claim. (Cl. 260—428.5)

This invention relates in general to solvent extraction and fractionation and more particularly to an improved solvent recovery system in which the greater part of the solvent is separated from the extract phase by indirect heat exchange with compressed solvent vapor, which latter is simultaneously condensed. Although the invention may be employed with any solvent system, its principal application is in the large fractionation systems of the petroleum refining industry; many of these employ a normally gaseous solvent, such as propane. Petroleum oils, for example, are improved by deasphalting or decarbonizing processes which involve contacting the oil with propane in a continuous counter-current tower system so that the oil is fractionated into extract and raffinate phases. The oil components are recovered from these phases by evaporating the solvent from them. Since the extract phase contains a large percentage of solvent (from 80 to 95% in typical cases), the evaporation step represents a substantial expenditure of heat.

A similar solvent extraction process is used for fractionating fatty oil mixtures containing high molecular compounds of ester type, fats, oils and waxes, into portions having different properties by introducing the mixture into a counter-current fractionation tower at approximately midpoint, flowing a liquid, low molecular-weight solvent upwardly from the bottom of said tower under temperature and pressure conditions near the critical temperature of the solvent and establishing a temperature gradient increasing with elevation in the tower to cause diminishing solubility, thereby precipitating a series of fractions at various elevations. This method of fractionating fatty oils likewise requires that the extract phase (and the raffinate phase also) be warmed under reduced pressure conditions so as to evaporate the solvent and recover the extract oil components. Following evaporation of the solvent it is necessary to condense it before recycling it to be again used in the extraction tower. It is a major object of the present invention to provide a novel and more efficient means for evaporating the solvent and recovering it for reuse in the process.

Ordinarily, and in the past, steam has been employed in heating tubes in an evaporating device in order to boil solvent out of the solvent-oil mixture. It is a second object of the present invention to reduce to a minimum the boiler capacity and the quantity of steam required.

It is also an object of the invention to provide a heating medium of lower temperature than steam for use with oils which tend to decompose at the temperature of steam.

It has also been necessary to provide separate water cooling means through which the evaporated solvent might be passed in order to cause it to condense. Another object of the present invention is to enable the solvent vapor to be condensed with a much smaller cooling means and less cooling water, or in some cases to eliminate the cooling means entirely.

These and other objects are accomplished by compressing (and thus heating) gaseous solvent which has been evaporated from the extract phase, and passing the compressed heated solvent through a suitable heat exchanging means in which heat is transferred from the recompressed solvent to the extract phase with the result that the former is condensed and solvent is evaporated from the latter. It is of course possible to apply the method of the invention to recovery of solvent from the raffinate phase as well as the extract phase; whether or not it is economical to do so will depend upon the solvent content of the raffinate phase.

A typical apparatus embodying my invention is shown in the accompanying drawing in which the solvent extraction process is carried out continuously in tower 10, which may be, for example, a deasphalting tower for the improvement of lubricating oil by solvent treatment with propane. Charge oil is introduced to an upper or intermediate portion of tower 10 by means of line 11, being pumped by pump 12 and heated by heater 13 just before introduction into tower 10. Propane is supplied from propane storage tank 14 through line 15, pump 16, and heat exchanger 17 for heating or cooling as may be necessary, to the lower part of tower 10.

A raffinate phase is withdrawn from tower 10 at its lower end through opening 18 and an extract phase from the upper end through line 19 and an expansion valve 20. The raffinate is recovered by means not shown (by the method of the present invention, if desired), and solvent separated therefrom is recycled to propane storage 14.

The extract phase is transferred from tower 10 to a flash drum 21; the reduction in pressure at valve 20 causes an appreciable portion of the solvent to vaporize, thus reducing the amount of solvent which has to be evaporated by heat transfer. The vapor from first flash drum 21 is diverted through line 22 and 23, to cooler 24 to propane storage drum 14. The pressure within flash drum 21, though less than the pressure within tower 10, is sufficiently high so that the vapor flashed therein is at a pressure slightly above that of storage drum 14 and may be liquefied merely by cooling in cooler 24. The remaining extract liquid (extract phase modified by the loss of solvent) is passed through a second pressure reduction valve 25 and again flashed at a still lower pressure in a second flash drum 26 in which a further reduction of pressure causes evaporation of more solvent. The solvent vapor in flash drum 26 is at too low a pressure to be condensed in storage drum 14 merely by cooling, however, and is passed through line 27 to compression means to be described hereinafter. Extract liquid from second flash drum 26 is withdrawn through line 28 to a first evaporator 29, in which the liquid is heated by indirect heat exchange with hot compressed propane vapor. The percentage of solvent which is recovered from the extract liquid in evaporator 29 is preferably limited to that amount which can be recovered with a relatively small increase in boiling temperature. In most cases, more than three-fourths of the solvent can be evaporated from the extract phase by suitable pressure reduction steps and by evaporation in evaporator 29 before the boiling point of the remainder begins to increase rapidly.

The remaining liquid is withdrawn from evaporator 29 through line 30 and valve 31 and pumped by pump 32 to evaporator 33, which preferably but not necessarily operates at a higher pressure than evaporator 29. Evaporator 33 is heated in the ordinary manner by indirect heat exchange with steam introduced at line 34; condensate is withdrawn through line 35. The evaporated propane from evaporator 33 is condensed in condenser 36 and recycled to propane storage tank 14 via line 23. An oily extract is withdrawn from evaporator 33 through line 33a. If desired, it may be subjected to further stripping to remove traces of solvent, for instance, by reduction in pressure and counter-current contact with stripping stream.

The novel feature of the present invention resides principally in the manner in which solvent evaporated in evaporator 29 is recovered and recycled for reuse in the process. The evaporated solvent is withdrawn from evaporator 29 through line 40 (and from vessel 26 through line 27) and passed to a knock-out drum 41. Entrained extract or other liquids are separated at this point and may be withdrawn from time to time from drum 41 through valve 42. The solvent vapor, substantially free of entrained liquids, passes out of drum 41 through line 43 and is compressed by means of compressor 44, preferably at a compression ratio of between 1.1 and 1.5. As a result of compression, the gases leaving compressor 44 have a higher temperature and pressure than the extract phase being introduced into evaporator 29. Preferably, the vapor is discharged from the compressor at a pressure under which the solvent condenses at a temperature not more than 50° F. above the evaporator temperature. Because of the higher temperature of the compressed vapor, it is capable of vaporizing solvent from the extract phase by indirect heat exchange; at the same time, because of its higher pressure it is capable of being condensed above the temperatures existing in evaporator 29. Consequently, the hot recompressed gaseous solvent withdrawn from compressor 44 through line 45 is employed as a heating means in the heating tubes of evaporator 29 and emerges from evaporator 29 to line 46 in liquefied form and is transmitted to propane storage tank 14. It will be evident at this point why there is an economic limit upon the percentage of solvent which can be separated by indirect heat exchange with recompressed solvent vapor. The present method usually becomes uneconomic if the cost of the energy expended in compressing solvent vapor in compressor 44 exceeds the savings in steam and cooling water. It is generally desirable that the heat equivalent of the power required for compressor 34 be not more than 10% of the heat transferred in evaporator 21; in some cases, the compressor energy may comprise a higher percentage of the heat transferred, as in locations where there is cheap water power, but it will be rare indeed that an allowable figure will exceed 20%. Since the boiling point of the extract phase increases as it loses its solvent, the method of indirect heat exchange with recompressed solvent vapor can be economically used for separating only part of the solvent from the extract phase in evaporator 29. The efficiency of the process may be increased by employing a series of evaporators and compressors, each operating at different temperatures and pressures. In such cases the compression ratio is lowest in the first stage and increases with each subsequent stage.

It is characteristic that the latent heat of vaporization of any liquid tends to decrease with increase of pressure and condensation temperature. Hence, in the present invention it is necessary to condense more than one pound of recompressed solvent in order to obtain enough heat by indirect heat exchange to evaporate one pound of solvent from the extract phase. However, in the illustrated embodiment there is available considerably more than one pound of recompressed solvent vapor for each pound of solvent to be evaporated in evaporator 29. The additional solvent vapor results from flash evaporization following pressure reduction in valve 25 and also from vapor which may, if desired, be diverted from line 23 through valve 47.

It will be found that it is generally desirable in employing the method of this invention to operate evaporator 29 at a lower pressure and temperature than would be the case if steam were used as the heating medium. Furthermore, somewhat more heat transfer surface may be specified. However, savings are effected in heat and also in apparatus since evaporator 29 serves both as a solvent evaporator and as a condenser. For example, in an appllication of my invention to the decarbonizing of petroleum oil prior to subjecting it to cracking, most of the oil is dissolved in solution of about 5 parts propane to one part oil. The temperature and pressure at the upper end of tower 10 may very suitably be 170° F. and 440 lbs. per square inch. First pressure reduction valve 20 will effect a reduction in pressure on the withdrawn extract phase so that it enters flash drum 21 at a pressure of about 315 pounds per square inch and a temperature of about 155° F. In second flash drum 26, the pressure is again reduced; a suitable temperature and pressure in flash drum 26 is 245 pounds per square inch and 130° F. The gaseous solvent after passing through line 40 (or line 27), knock-out drum 41 and line 43, enters compressor 44. After recompression, the temperature has increased to 155° F. and the pressure to about 310 pounds per square inch. The latent heats of vaporization of the extract phase and the hot recompressed gaseous solvent are 121 B. t. u./# and 111 B. t. u./# respectively. It will therefore be seen that approximately 1.09 pounds of solvent vapor need be condensed in evaporator 21 for each pound evaporated therein. In this instance the solvent vapor in line 30a make up the deficiency of vapor in line 30.

In another example, the present method may be applied to the concentration of vitamins from fish oil by solvent fractionation with propane. In such a system, the propane may be introduced into the bottom of a solvent fractionation tower at a temperature of about 180° F. and withdrawn at the top of the tower, containing a vitamin extract oil, at about 190° F. and under a pressure of about 535 pounds gauge. After passing through a reduction valve a substantial portion of the solvent in this extract phase is flash vaporized to a temperature of about 165° F. and at a pressure of about 385 pounds gauge. This vapor may be passed through a condenser, liquefied, and passed to a storage tank at 160° F. and 365 pounds gauge. The remainder of the extract liquid may be again subjected to a reduction in temperature and pressure (to about 88° F. and 145 pounds per square inch) to vaporize more of the propane, and then passed to one or more evaporator stages, at least one of which employs indirect heat exchange with hot compressed propane vapor. The vapor withdrawn at this stage must be recompressed to about 385 pounds gauge (at a temperature of 230° F.); cooling will condense this vapor to liquid propane at storage tank conditions (160° F. and 365 pounds per square inch gauge). The cooling of said recompressed propane from 230° F. to 160° F. may be accomplished by indirect heat exchange with all or a portion of the modified extract liquid in the previously mentioned evaporator stage. In the indirect heat exchange, the extract liquid is warmed to about 110° F. and loses still more of its solvent. In a plant for treating 3600 gallons per stream day of vitamin oil, about 8 million B. t. u./hr. of cooling must be accomplished to condense recompressed propane vapor. In one design about one-half of this cooling is accomplished by indirect heat exchange between extract phase and recompressed solvent vapor, conventional means being used for the remainder of the cooling.

Both the foregoing examples have involved the employment of a liquefied normally gaseous solvent in an extraction system operated at temperatures in the range, near the critical temperature of the solvent, in which solubility decreases as temperature increases, a system to which the present method of solvent separation is particularly applicable. Propane, the solvent most commonly used in these systems, may be conveniently evaporated from the extract phase (or, in some cases, the raffinate phase) by flowing it as a stream having temperatures in the range of 85° F. to 160° F. in indirect heat exchange with a counterflowing stream of hot compressed solvent vapor having temperatures in the range of 90° F. to 180° F.

I claim:

In the solvent treatment of an oil with a liquefied normally gaseous solvent in a treating zone at temperatures near the critical temperature of the solvent and under high pressures adapted to maintain said solvent in a liquid condition in said treating zone at said temperatures, and wherein solvent for said process is stored as a liquid under a storage pressure and temperature substantially lower than said treating zone temperatures and pressures, an improved method of recovering solvent from an extract phase mixture of solvent and oil withdrawn from said treating zone, which method includes the steps of: discharging said extract phase mixture from said treating zone into a zone at not lower than said storage pressure to evaporate part of the solvent content and reduce the temperature of said extract phase mixture; discharging said partially desolventized extract phase mixture to a still lower pressure and heating it by indirect heat exchange to evaporate additional solvent from said extract phase mixture; recompressing solvent vapor evaporated in said second evaporation step to a pressure not lower than said storage pressure; flowing said hot recompressed solvent vapor through said heat exchange zone in indirect heat exchange with said extract phase mixture to cool and condense said solvent vapor and to simultaneously supply said heat to said extract phase mixture by indirect heat exchange; cooling said separated solvent to said storage zone temperature and flowing it to said storage zone; and continuously pumping and heating solvent from said storage zone to said treating zone pressure and temperature.

NORMAN L. DICKINSON.

REFERENCES CITED

The following references are of record in the file of this patent:

UNITED STATES PATENTS

| Number | Name | Date |
| --- | --- | --- |
| 2,052,722 | Radasch | Sept. 1, 1936 |
| 2,115,003 | Beiswenger | Apr. 26, 1938 |
| 2,383,535 | Dickinson et al. | Aug. 28, 1945 |
| 2,492,787 | Davis | Dec. 27, 1949 |